United States Patent

Izumi et al.

[11] Patent Number: 6,040,873
[45] Date of Patent: Mar. 21, 2000

[54] APPARATUS AND METHOD FOR PROCESSING MOVING IMAGE DATA

[75] Inventors: Nobuaki Izumi, Chiba; Shinichi Fukushima, Kanagawa; Junichi Tsukamoto, Tokyo, all of Japan

[73] Assignee: Sony Corporation, Tokyo, Japan

[21] Appl. No.: 08/856,247

[22] Filed: May 14, 1997

[30] Foreign Application Priority Data

May 17, 1996 [JP] Japan .................................. 8-146498

[51] Int. Cl.[7] ........................................................... H04N 7/01
[52] U.S. Cl. ...................... 348/559; 348/452; 348/208; 348/155
[58] Field of Search ........................... 348/559, 700–702, 348/452, 208, 220, 231–233, 153, 154, 155; H04N 7/01

[56] References Cited

U.S. PATENT DOCUMENTS

| | | | |
|---|---|---|---|
| 4,679,084 | 7/1987 | Topper et al. | 358/160 |
| 5,030,984 | 7/1991 | Buckler et al. | 396/153 |
| 5,099,323 | 3/1992 | Morimura et al. | 348/208 |
| 5,226,114 | 7/1993 | Martinez et al. | 395/128 |
| 5,337,154 | 8/1994 | Dorricott et al. | 348/448 |
| 5,428,399 | 6/1995 | Robinson et al. | 348/459 |
| 5,579,054 | 11/1996 | Sezan et al. | 348/452 |
| 5,627,586 | 5/1997 | Yamasaki | 348/169 |
| 5,648,815 | 7/1997 | Toba | 348/208 |
| 5,737,022 | 4/1998 | Yamaguchi et al. | 348/416 |
| 5,751,364 | 5/1998 | Yasuda et al. | 348/416 |
| 5,825,415 | 10/1998 | Kaneda et al. | 348/208 |
| 5,903,307 | 5/1999 | Hwang | 348/208 |
| 5,905,527 | 5/1999 | Inou et al. | 348/208 |
| 5,909,242 | 6/1999 | Kobayashi | 348/208 |
| 5,918,192 | 6/1999 | Tomaszewski | 348/231 |

OTHER PUBLICATIONS

Malcher D et al: "TV–Multimedia–PC Arbeiten, Informieren Und Unterhalten Ohne Grenzen" Fernseh Und Kinotechnik, vol. 50, No. 3, Mar. 1, 1996, pp. 104–109, XP000581419, p. 106, col. 3, line 1–p. 107, col. 3, line 7.

*Primary Examiner*—John K. Peng
*Assistant Examiner*—Jean W. Désir
*Attorney, Agent, or Firm*—Frommer Lawrence & Haug, LLP.; William S. Frommer; Dennis M. Smid

[57] ABSTRACT

An apparatus and method for processing moving image data so as to obtain stationary image data representative of a desired image frame which is suitable for display on a display device. A moving portion of the image data corresponding to the desired image frame is detected and the image data corresponding to the detected moving portion is interpolated in accordance with a predetermined interpolation technique. A stationary image corresponding to the interpolated image data may be displayed on the display device with relatively high quality. The motion detection and field interpolation processing may eliminate or reduce stripes or the like which may otherwise be present in the displayed stationary image due to a deviation of the image data between the fields of the respective frame. Coefficients utilized for the motion detecting processing may be taken from previously stored values or may be set by an operator.

9 Claims, 8 Drawing Sheets

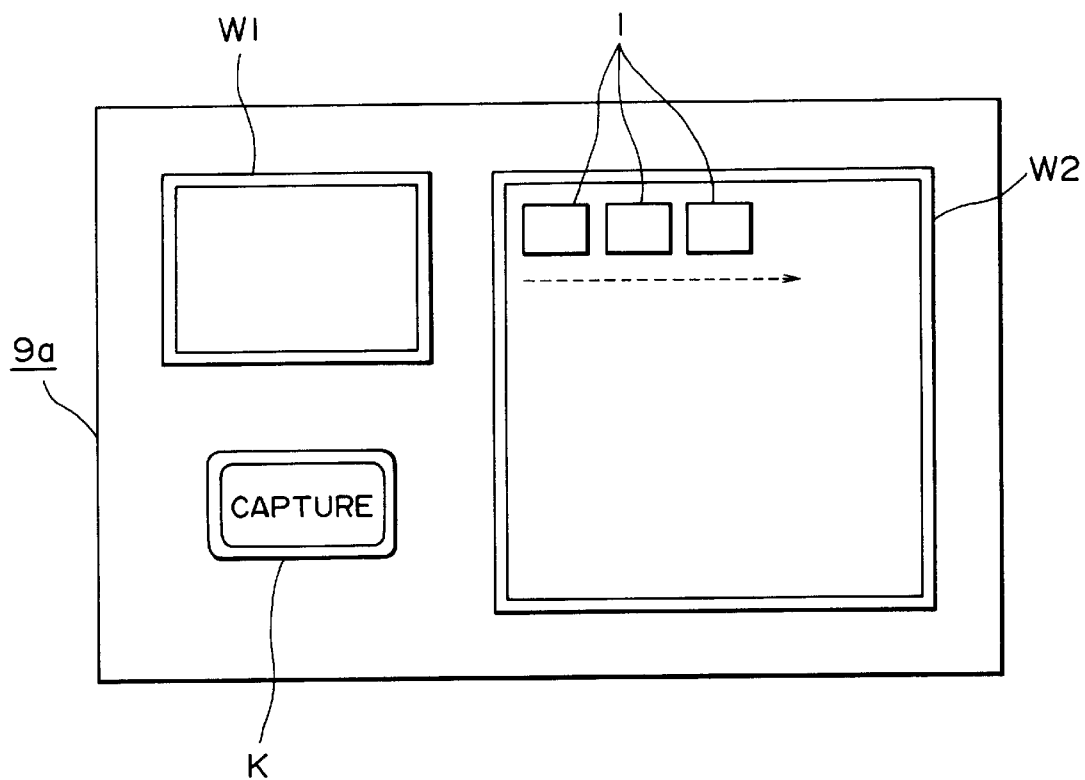

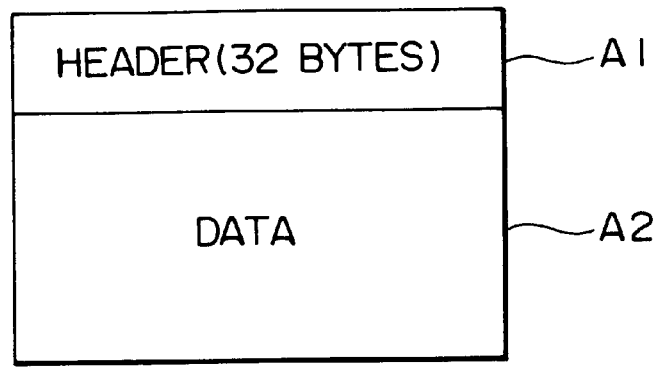

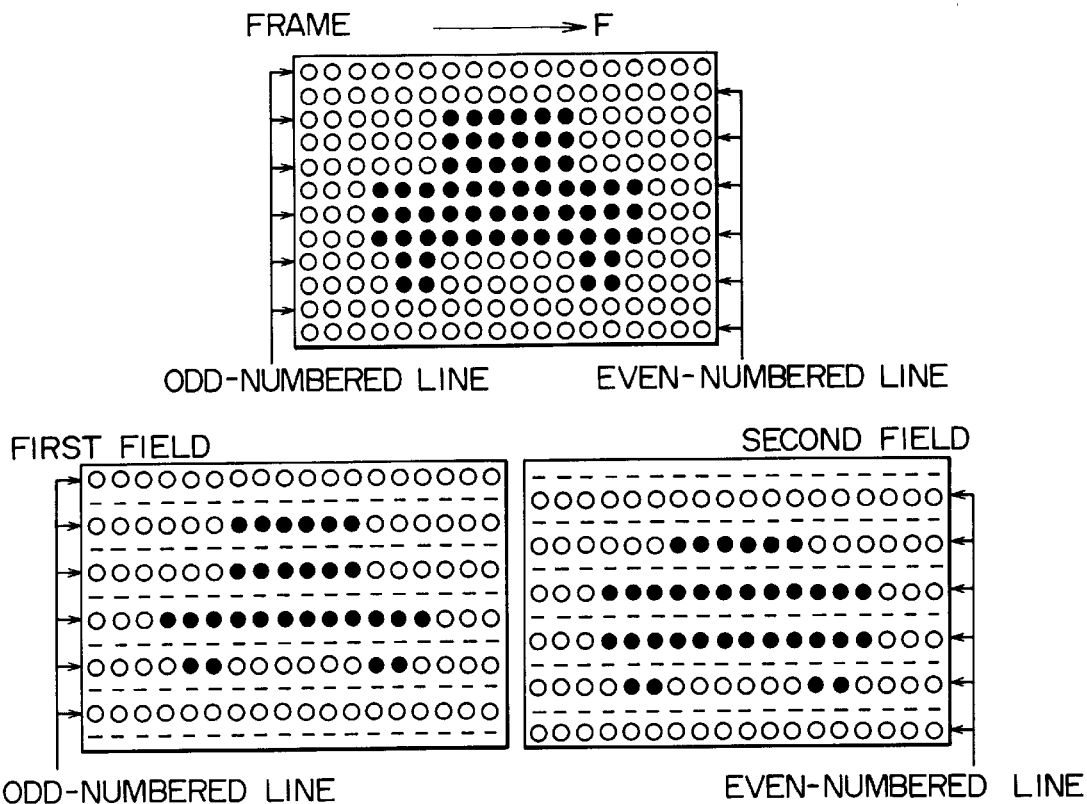
FIG. 4A
FIG. 4B  FIG. 4C
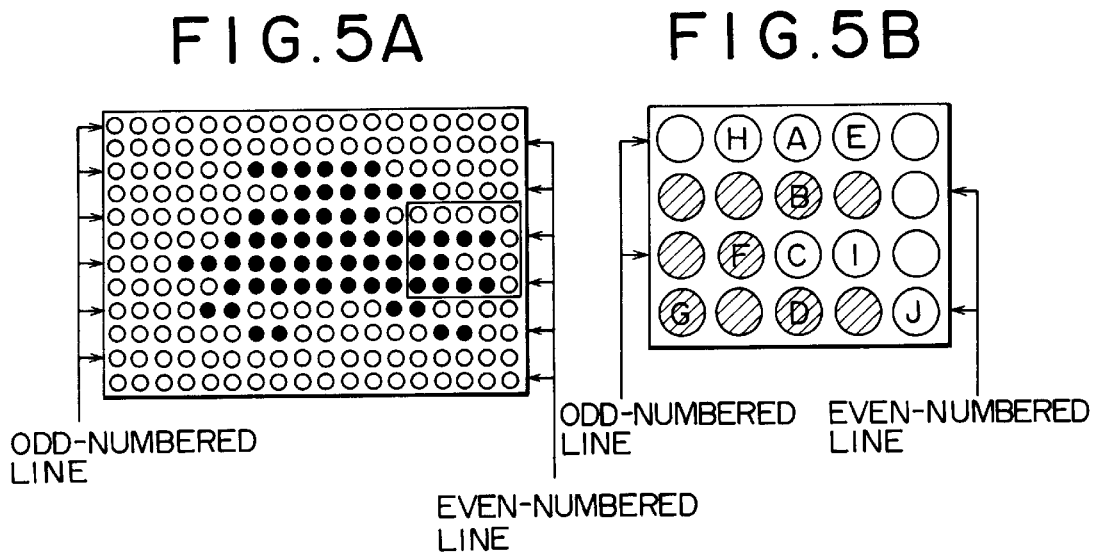
FIG. 5A  FIG. 5B

APPARATUS AND METHOD FOR PROCESSING MOVING IMAGE DATA

BACKGROUND OF THE INVENTION

The present invention relates to an image signal apparatus and method for capturing moving image data, which may be supplied from a digital video tape recorder (VTR) or the like, and for processing and/or interpolating the captured image data so as to obtain stationary image data representative of a desired image frame which is suitable for display on a display device.

A computer, such as a so-called personal computer, may process image data supplied from an external device and/or display such data on a monitor unit connected to the computer. Such external device may be an analog VTR or a digital VTR (such as a digital video camera or a so-called digital cam-coder) which may record and/or reproduce image data of a moving image or images. As is to be appreciated, the digital VTR may provide a higher quality image signal than that of the analog VTR. Therefore, a digital VTR may supply data corresponding to a number of fields or frames of image or video data to a computer, whereupon such data may be processed and displayed on a monitor.

With regard to the display of data, it may be desired to display a stationary image corresponding to only a single frame or the like. However, if the data of such frame represents a moving image or images, the stationary image which is displayed may not be acceptable. More specifically, moving image data from a digital VTR or the like may be supplied to a personal computer, whereupon an image file may be formed in frame units. An operator may select a desired image from one of the frames in the image file for display as a stationary image on a display device. Such frame may be formed from a first field and a second field in an interlace manner. As a result, if such frame includes (or is part of a sequence of frames which includes) a moving image or images, movement between the image of the first field and that of the second field may exist due to the time separation between the first and second fields. Such movement or deviation between the first and second fields may cause stripes or the like to be produced in the displayed stationary image thereby deteriorating the quality of such displayed image. As is to be appreciated, the greater the movement or deviation between the first and second fields, the greater the deterioration in the quality of the displayed image.

OBJECTS AND SUMMARY OF THE INVENTION

An object of the present invention is to provide an image signal technique for processing image data supplied from a digital VTR or the like so as to obtain stationary image data representative of a desired image frame which is suitable for display on a display device.

In the present image signal processing technique, image data representative of a moving image or images and corresponding to a desired frame may be decoded in accordance with a predetermined decoding process. The decoded data may be subjected to motion detection processing. Image data corresponding to a detected moving portion may be interpolated in accordance with a predetermined interpolating process. Such interpolation, which may be field interpolation, may reduce stripes or the like which may otherwise appear at the area near the threshold value of the stationary part and moving part of the image. As a result, an acceptable or relatively high quality stationary image may be displayed.

Further, a motion detecting coefficient or coefficients utilized for performing the motion detecting processing which, in turn, is utilized for the field interpolation processing may be freely or selectively set in accordance with the condition of the moving part. Additionally, interpolation processing may be performed for various stationary images.

In accordance with an aspect of the present invention, an apparatus and method for processing moving image data so as to obtain stationary image data representative of a desired image frame and suitable for display on a display device is provided. The apparatus comprises a motion detector for detecting a moving portion of the image data corresponding to the desired image frame, and an interpolator for interpolating the image data corresponding to the detected moving portion in accordance with a predetermined interpolation technique. The method for processing moving image data comprises corresponding steps and, as such, will not be further described herein.

Other objects, features, and advantages according to the present invention will be apparent from the following detailed description of illustrated embodiments when read in conjunction with the accompanying drawings in which corresponding components are identified by the same reference numerals.

BRIEF DESCRIPTION OF THE DRAWINGS

FIG. 2 is a diagram of a display format of a display screen of a monitor unit which may be used in the apparatus of FIG. 1;

FIGS. 3A and 3B are diagrams to which reference will be made in explaining an image file structure;

FIGS. 4A, 4B, and 4C are diagrams of pixels of an image file to which reference will be made in explaining motion detecting and interpolating processing;

FIGS. 5A and 5B are diagrams to which reference will be made in explaining motion detecting and interpolating processing;

DESCRIPTION OF THE PREFERRED EMBODIMENTS

The preferred embodiments of the present invention will now be explained with reference to the accompanying drawings.

Figure 1:
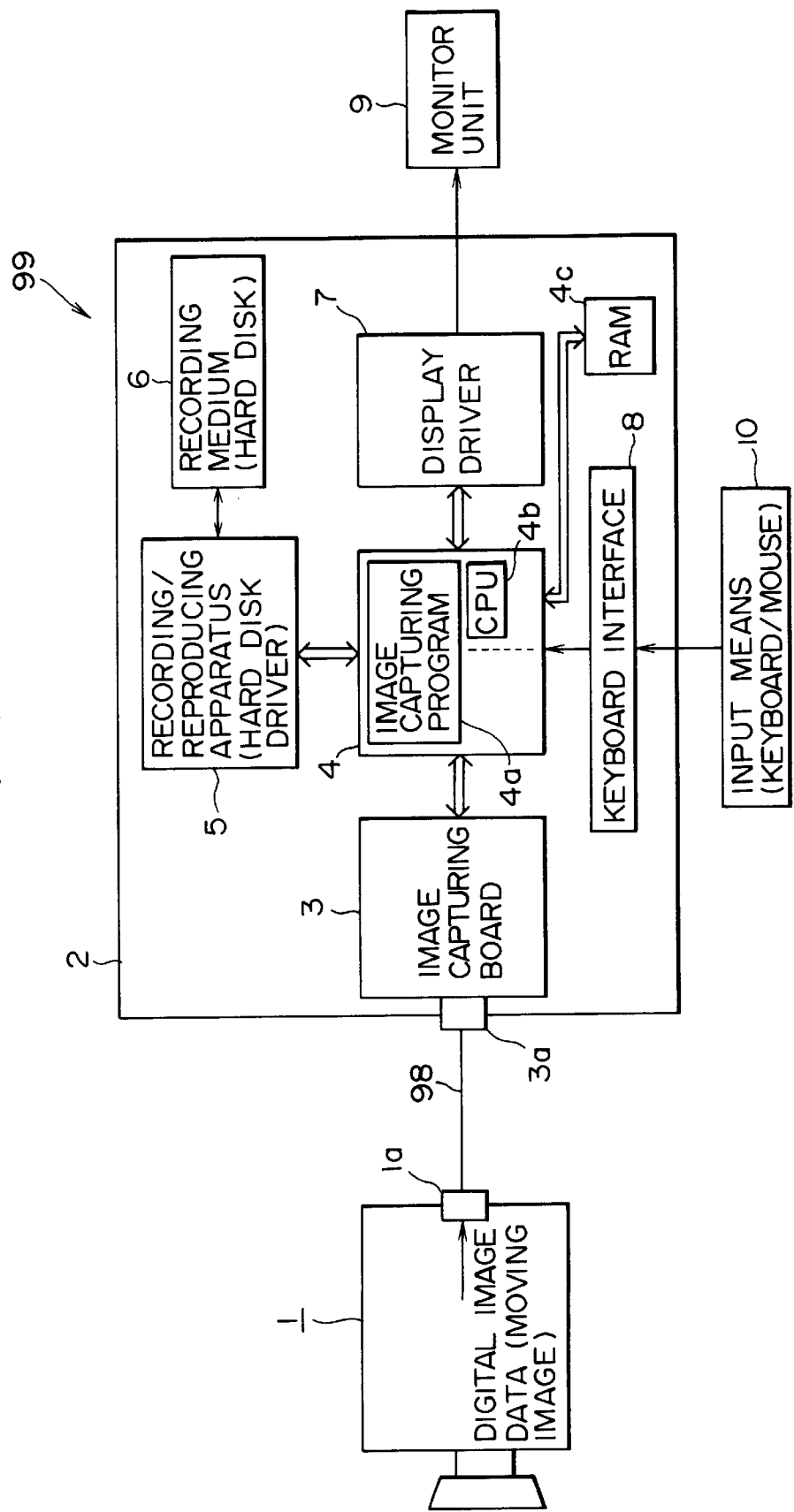
FIG. 1 is a diagram of an image extracting and processing apparatus according to an embodiment of the present invention.

FIG. 1 illustrates an image extracting and processing apparatus 99. As shown therein, such apparatus generally includes a digital VTR 1, a computer 2, and a monitor unit 9.

The digital VTR 1 may be a digital cam-coder or the like. Such digital VTR may pick up an image, which may be a moving image, and process the same so as to form a digital image signal representative of a moving picture which is recorded onto a recording medium such as a tape in a 8 mm tape cassette or the like. The recorded digital image signal may be reproduced by the digital VTR 1 and outputted therefrom by way of a digital image signal output terminal (hereinafter, DV terminal) 1a. Such image data may be processed so as to have a predetermined format as more fully described hereinafter.

The computer 2, which may be a personal computer or the like, may include a image capturing board 3, a control device 4, a recording/reproducing unit 5, a recording medium 6, and a display driver 7 which are arranged as shown in FIG. 1. The computer 2 may receive image data from the digital VTR 1 and may generate therefrom a data file of images which may be stored therein. A desired one(s) of the stored images may be processed so as to form a stationary image data signal for supply to the monitor unit 9 which enables an acceptable stationary image corresponding to the desired image to be displayed thereat. The above-mentioned elements included within the computer 2 will be further described below.

The reproduced digital moving image data may be supplied from the DV terminal 1a of the digital VTR 1 through a cable 98 and a DV terminal 3a to the image capturing board 3 of the computer 2. Such DV terminal 3a may be part of the image capturing board 3. The image capturing board 3 is adapted to capture the image data supplied from the digital VTR 1. The image data may be transferred between the digital VTR 1 and computer 2 in accordance with a predetermined data transfer network or specifications such as those of IEEE 1394.

The control device 4 may be coupled to the image capturing board 3, the recording/reproducing unit 5, the display driver 7, and a keyboard interface 8. The control device 4 may include a central processing unit (CPU) 4b for performing or executing a number of processing controls or operations of the computer 2. An image capturing/displaying software program 4a may be installed in the control device 4 for performing image capturing through the image capturing board 3. The image capturing board 3 and image capturing/ displaying program 4a may be supplied as a set. Further, the image capturing/displaying program 4a may cause data to be processed in a predetermined manner so as to generate image data for display on the monitor unit 9. That is, as hereinafter more fully described, image data supplied from the image capturing board 3 and/or image data stored in the recording medium 6 (which may have been previously supplied from the image capturing board) may be subjected to predetermined demodulation processing and/or field interpolation processing in accordance with motion detection results. As also hereinafter more fully described, a display format for setting a coefficient or coefficients which may be utilized for motion detection may be formed and outputted. A random access memory (RAM) 4c, which may be coupled to the control device 4 or included therein, may be utilized for storing data to be processed by the control device 4 and/or data processed by the control device.

The recording/reproducing unit 5 may be coupled to the control device 4 and the recording medium 6. The recording/ reproducing unit 5 is adaptable to drive the recording medium 6, which may be a hard disk recording medium, so as to store information therein (such as data files) and/or to retrieve stored information therefrom. Alternatively, if the recording medium 6 is a removable hard disc, floppy disc, or other type of external memory device, the recording/ reproducing unit 5 may be a driver to drive the same (instead of a hard disc driver).

The recording medium 6 is driven or controlled by the recording/reproducing unit 5. As a result, data may be written into the recording medium 6 and/or read therefrom. As previously indicated, the recording medium 6 may be a hard disc or other types of memory media (such as a removable hard disc, a floppy disc, and so forth).

The display driver 7 may be coupled to the control device 4 and the monitor unit 9. The display driver 7 may receive image data from the control device 4 and, in accordance with operation instructions from the control device 4, may convert the same to output data signals for supply to the monitor unit 9 for display thereon. For example, the display driver 7 may convert the image data received from the control device 4 to a RGB (red, green, blue) signal and may supply the same to the monitor unit 9.

The computer 2 may be connected to an input device 10, such as a keyboard, a mouse, and so forth. Such input device 10 may enable an operator to supply information and/or command instructions to the computer 2 so as control the operation of the apparatus 99. More specifically, such information or instructions may be supplied from the input device 10 to the control unit 4 by way of the keyboard interface 8 of the computer 2, whereupon the control unit may perform (or cause to be performed) the associated or requested processing operations.

The monitor unit 9 is coupled to the display driver 7 and, as a result, may receive an output data signal (such as a RGB signal) therefrom whereupon an image corresponding thereto may be displayed.

An operation for capturing an image and processing the same using the image extracting and processing apparatus 99 of FIG. 1 will now be described.

Initially, an operator may connect the digital VTR 1 to the computer 2 by connecting the cable 98 between the DV terminals la and 3a as shown in FIG. 1. The operator may then activate the image capturing/displaying program 4a by use of the input unit 10, such as by activating or depressing a predetermined keying sequence or the like of the input unit. Thereafter, the operator may activate a reproducing operation of the digital VTR 1, whereupon reproduced image data may be supplied as a digital signal to the computer 2 by way of the DV terminal 1a, the cable 98, and the DV terminal 3a. Such received digital signal may be processed by the computer 2 and displayed on the monitor unit 9 in a predetermined manner.

FIG. 2 illustrates a display format which may be utilized for displaying a captured and/or processed image on the display 9a of the monitor unit 9. As shown therein, such display format may include a display window W1, a display window W2, and a capturing key display K.

The image capturing/displaying program 4a may generate display image information for capturing a desired frame (as a stationary image) from the supplied image data. Such display image information may be displayed in the VTR image display window Wi located in the upper left portion of the display 9a as shown in FIG. 2. As a result, an image reproduced by the digital VTR 1 may be displayed in the VTR image display window W1 like a moving image. While viewing the VTR image display window W1, the operator may designate the display of a desired image to be captured by, for example, moving a cursor (not shown) to a part of the image capturing key display K and executing or activating such entering operation by use of the keyboard or the mouse of the input device 10. Thus, by utilizing the image capturing/displaying program 4a, an operator may capture a desired frame of the image being displayed in the VTR image display window W1. Such captured frame, or stationary image, may be written as a data file to the recording medium 6.

An image file icon I, which illustrates a stationary image data file or files, may be generated depending on the above-described operations or capturing sequence and displayed in a region of the capturing image display window W2. As a result, an operator may detect the capturing of a stationary image data file which may be obtained as described above.

A format of a stationary image data file will now be described.

Frame data which is to be captured as the data or image file of a stationary image may be converted or processed so as to have a predetermined format such as that illustrated in FIGS. 3A and 3B. More specifically, FIG. 3A illustrates a data format of an image file of one frame of a stationary image and FIG. 3B illustrates a data format of a header area A1. The acquisition of data file from stationary image may be obtained by the image capturing/displaying program 4a.

As shown in FIG. 3A, an image file may include the header area A1 and a data area A2. The header area A1 may have 32 bytes of data starting at the leading edge thereof and such data may be arranged in accordance with a so-called "Big Endian" technique in units of 4 bytes. (Big Endian is a technique for storing data and, in particular, is directed to the order in which each byte of data is transferred between a CPU and a memory. As an example, consider the situation wherein four bytes of data (byte0 to byte3 in which byte0 is the least significant byte and byte3 is the most significant byte) are stored in a memory in accordance with a Big Endian technique. In such situation, the upper bytes are stored in the memory prior to the lower bytes. That is, byte3 is stored at address N, byte2 is stored at address N+1, byte1 is stored at address N+2, and byte0 is stored at address N+3.) The header area A1 may include file management information utilized for managing image files recorded on a recording medium, as hereinafter more fully described with reference to FIG. 3B. In the data area A2, a predetermined amount of image data may be provided such as that associated with one frame. Further, such image data may be arranged in accordance with a Big Endian technique in units of 2 bytes. In a SD525 format (which corresponds to a NTSC system), 149 blocks of data (in which 1 block has 80 bytes) may be sequentially arranged in each of ten tracks (that is, track 0 to track 9). In a SD625 format (which corresponds to a PAL system), 149 blocks of data may be sequentially arranged in each of 12 tracks (that is, track 0 to track 11). As such, the data size of an image file may be fixed. That is, in the SD525 format, the data size is fixed to 119,232 bytes (=32 +149×80×10); and, in the SD625 format, the data size is fixed to 143,072 bytes (=32+149×80×12).

As shown in FIG. 3B, the header area A1 may include (from the leading edge) a file identifier area A11, a file version area A12, a detail format information area A13, a data attribute area A14, a file size area A15, a data size area A16, a data offset area A17, and an undefined area A18.

The file identifier area A11 may include data (such as 4 bytes of ASCII code or the like) for file identification. As an example, the file identification area A11 may include "DVF".

The file version area A12 may include data (such as 4 bytes of ASCII code or the like) for specifying the version of the respective file. For example, if the respective file is version 1.00, the file version area may include data indicative of "1.00".

The detail format information area A13 may include data (such as 3 bytes of ASCII code) which indicates the format or television system corresponding thereto. For example, such format information data may be "SD5" when the corresponding television system has a SD525 format, and such data may be "SD6" when the corresponding television system has a SD625 format.

Although only two types of television formats have been described herein, the present invention is not so limited and may be utilized with a number of other types of television formats. Such other types of television formats may include a so-called SDL525 format, a SDL625 format, a HD1125 format (which corresponds to a high definition NTSC system), a HD1250 format (which corresponds to a high definition PAL system). In these latter situations, the above-described format information data may be "SL5", "SL6", "H11", and "H12", respectively.

The data attribute area A14 may include one byte of data indicative of an attribute of a predetermined or respective image file.

The file size area A15 may include 4 bytes of binary data indicative of the data size of one image file. For example, in the SD525 format wherein the data size of an image file is fixed to 119232 bytes as previously described, the data in the file size area A15 may be "0001D1C0" (which is 119232 expressed in hexadecimal notation). As another example, in the SD625 format wherein the data size of an image file is fixed to 143072 bytes as previously described, the data in the file size area A15 may be "00022EE0" (which is 143072 expressed in hexadecimal notation).

The data size area A16 may include 4 bytes of binary data indicative of the size of data area A2 for one image file. For example, in the SD525 format wherein the size of the data area A2 of an image file is 119200 bytes (119232−32= 19200), the data in the area A16 may be "0001D1A0" (which is 19200 expressed in hexadecimal notation). As another example, in the SD625 format wherein the size of the data area A2 of an image file is 143040 bytes (143072− 32=143040), the data in the area A16 may be "00022EC0" (which is 143040 expressed in hexadecimal notation).

The data offset area A17 may include 4 bytes of binary data which specifies an offset from the header area A1 to the data area 2. That is, such offset is the area from the leading position to the ending position of the header area A1 of an image file. As a result, for the above-described situation, the offset has a value of "100000020" (which is equivalent to 32 bytes in hexadecimal notation). However, if the amount of data to be inserted in the header area A1 is different that 32 bytes, the size of the header area A1 may be adjusted in accordance therewith and the data offset area A17 may be changed accordingly.

The area A18 is a reserved area. Such area may include 8 bytes of data.

Therefore, the image capturing/displaying program 4a may generate an image file from captured image data having the format of FIG. 3. That is, the program 4a adds a header (header area A1) to the frame data supplied to the control device 4 from the image capturing board 3 by setting the data of each area therein so as to correspond to the respective image and/or type thereof (for example, that corresponding to a NTSC or PAL system) in accordance with the format of FIG. 3. A file name may be assigned to the generated image file which may be written into the recording medium 6.

Thus, image data may be supplied from the digital VTR 1 by way of the DV terminal 1a and the cable 98 to the computer 2 and may be compressed in accordance with a predetermined compression technique. Further, an image file may be formed by providing a header to the compressed image data of one frame. As a result, the size of an image file is relatively small and, accordingly, the recording capacity of the recording medium for recording the image file may be used effectively.

An image recorded as an image file to the recording medium 6 may include a moving part so that the displayed image may oscillate or appear unsatisfactory. To compensate or correct such situation, motion detecting and field interpolating processing may be performed. Such motion detecting and field interpolating processing will now be described.

FIGS. 4A–C illustrate pixels of an image (that is, an automobile) recorded as an image file. (The pixels are indicated by circles which form scanning lines.) That is, FIG. 4A indicates image data or pixels of one frame, FIG. 4B indicates image data or pixels of the odd number lines of the frame indicated in FIG. 4A (or a first field), and FIG. 4C indicates image data or pixels of the even number lines of the frame indicated in FIG. 4A (or a second field). In other words, the image data of the frame of FIG. 4A is formed by the first and second fields of FIGS. 4B and 4C. If the automobile is stopped when its image is captured, the automobile image may be displayed substantially in the same position in the first and second fields (FIGS. 4B and 4C). However, if the automobile is moving (such as in a direction "F") when its image is captured, the positions of the automobile in the first and second fields may be different in the F direction. In other words, when the image having a moving part is captured, the image data for each line of the frame may be different or may deviate therebetween due to the time difference between the first field (odd number lines) and second field (even number lines) as, for example, that shown in FIG. 5A. Such image data may be recorded in the recording medium 6 and displayed on the monitor unit 9. As is to be appreciated, such displayed image may not be acceptable. In particular, the image near the background and the contour of the automobile may appear rough or jagged. Such situation may be compensated or corrected by subjecting the image file recorded in the recording medium 6 (which is in the condition shown in FIG. 5A) to motion detection and, in accordance with the motion detection results, interpolating the deviation between the fields (or the moving part thereof) by field interpolation.

Figure 6A:
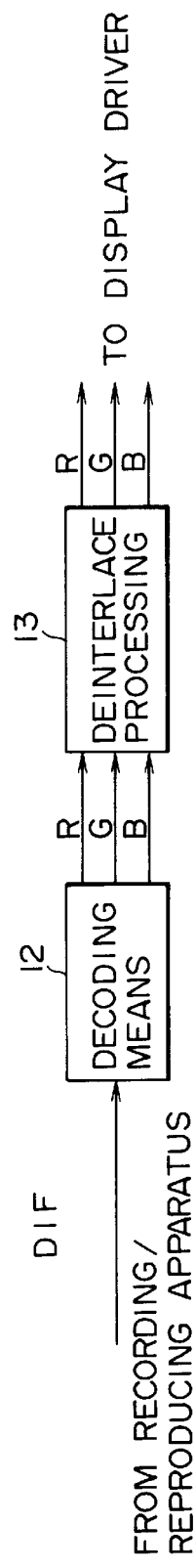
FIG. 6A is a diagram of a portion of a control device of the apparatus of FIG. 1.

The above-described motion detection and field interpolation along with the previously mentioned predetermined decoding may be performed in an image processing block of the image capturing/displaying program 4a, an example of which is illustrated FIG. 6A. As shown therein, such processing block includes a decoding device 12 and a deinterlace processing device 13. An image file read from the recording medium 6 may be supplied by way of the recording/reproducing apparatus 5 to the decoding device 12 and decoded or demodulated thereat in accordance with a predetermined decoding process, whereupon RGB (red, green, blue) signals may be obtained and supplied to the deinterlace processing device 13. Such RGB signals may be subjected to motion detection and field interpolation processing in the deinterlace processing device 13. The interpolated RGB signals may be supplied to the display driver 7 (FIG. 1).

Figure 6B:
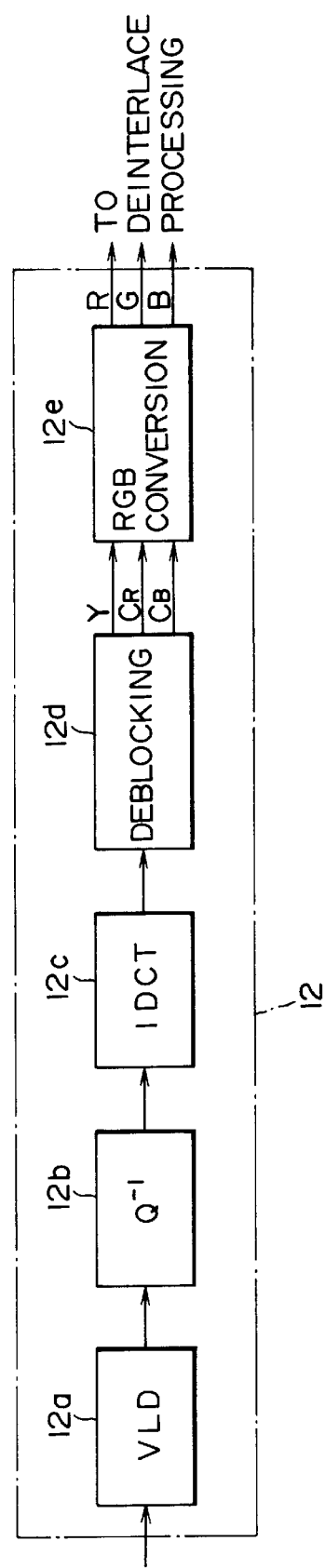
FIG. 6B is a diagram of a portion of a decoding device of the control device of FIG. 6A.

As shown in FIG. 6B, the decoding device 12 may include a variable length decoding section 12a, an inverse quantizing section 12b, an inverse discrete cosine transfer (IDCT) section 12c, a deblocking section 12d, and a RGB converting section 12e. The image file or variable length encoded data read from the recording medium 6 is supplied to the variable length decoding section 12a so as to be decoded or processed thereat in accordance with a predetermined technique, such as by a run-length coding or a Huffman coding technique. The decoded variable length data from the variable length decoding section 12a may be supplied to the inverse quantizing section 12b, wherein a predetermined quantizing step (or multiplication coefficient) may be determined and utilized to generate coefficient data. For example, the quantizing step may be multiplied by the decoded variable length data so as to obtain the coefficient data. The coefficient data is supplied to the IDCT section 12c so as to form therefrom data having a predetermined DCT block format such as that of 8×8 pixels. The DCT block formatted data from the IDTC section 12c is supplied to the deblocking section 12d wherein such data may be converted into luminance (Y) and color difference signals (Cr (R-Y), Cb (B-Y) in an interlace scanning sequence. The luminance and color difference (Y, Cb, Cr) signals may be supplied from the deblocking section 12d to the RGB converting section 12e and converted thereat to RGB signals. The RGB signals from the RGB converting section 12e may be supplied to the deinterlace processing device 13 (FIG. 6A), wherein such RGB signals may be subjected to motion detection and field interpolation processing.

An example of the motion detecting processing which may be performed by the deinterlace processing device 13 will now be described with reference to FIG. 5B. (FIG. 5B illustrates an enlarged view of 20 pixels which is taken from an area surrounded by a solid line in FIG. 5A.) To detect whether a pixel B moves in a horizontal direction, the following equations may be utilized:

$$(A-B) \times (B-C) < K \tag{1}$$

$$(B-C) \times (C-D) < K \tag{2}$$

The pixel B may be assumed to be moving in the horizontal direction when one or both equations (1) and (2) are satisfied. More specifically, in equations 1 and 2, the coefficient K may have a negative value. Additionally, the pixels A and C may be located in a first field and the pixels B and D may be located in a second field. When $(A-B) \times (B-C) < K$ is satisfied, the pixel B in the image plane may be on the right or left side of the pixels A and C, and the pixel B may be located at a distance from the pixels A and C in the horizontal direction. The equation 2 is utilized to avoid or minimize erroneous determinations such as those which may occur from a static object. In particular, when equation 2 is satisfied, pixel C may be moving. As such, determining whether two adjacent pixels move increases the likelihood that the motion detection results are correct.

To detect whether the pixel B moves in an oblique direction, the following equations may be utilized:

$$(E-B) \times (B-F) < K \tag{3}$$

$$(B-F) \times (F-G) < K \tag{4}$$

For reasons similar to those previously described with regard to equations 1 and 2, the pixel B may be assumed to be moving in the oblique direction when one or both of equations (3) and (4) are satisfied.

To detect whether the pixel B is moving based upon motion obtained from a difference in fields, the following equation may be utilized:

$$|((A+C)/2)-B| < K2 \tag{5}$$

As hereinafter more fully described, the coefficients K and K2 may be selected by an operator.

Therefore, if one of the equations (1) to (5) is satisfied, the pixel B may be assumed to be moving. Based upon such motion detection results, field interpolation may be performed with regard to the pixel B. In a similar manner, motion detection may be performed for other pixels so as to detect the moving pixels in the image data.

The field interpolating processing which may be performed by the deinterlace processing device 13 for pixels having detected motion (as determined by the above-described motion detecting processing) will now be described with regard to FIG. 7. In particular, a so-called soft switching system will be described with regard to FIG. 7A and a so-called difference minimum value interpolating system will be described with regard to FIG. 7B.

Figure 7A:
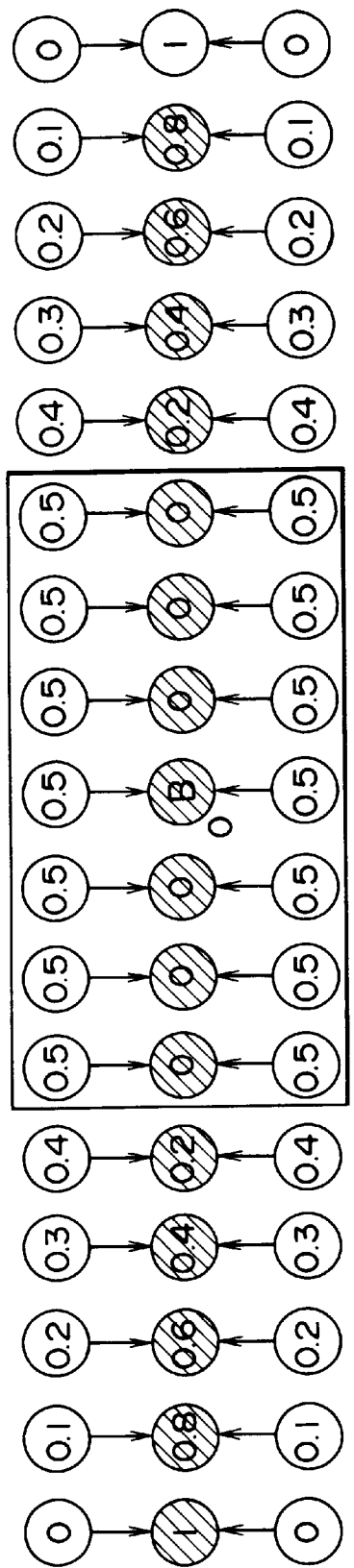
FIGS. 7A and 7B are diagrams to which reference will be made in explaining a field interpolation process.
Figure 7B:
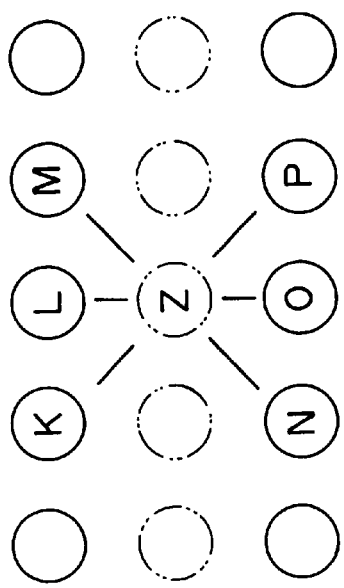

In the soft switching system shown in FIG. 7A, a "perfect" interpolating process may be performed for the pixel B and other pixels in the 20 pixel moving part surrounded by a solid line. That is, the pixel B and the pixels on the same line as the pixel B in the interpolation or compensation area may be "perfectly" interpolated by use of the pixel information of the upper and lower lines. For the pixels outside the compensating area, a weighted interpolation processing may be performed in consideration of the distance from the pixel B. As the distance from the pixel B increases, the effect on the interpolation thereon may decrease. Pixels located at a predetermined distance from the pixel B, may have no effect or may not be involved in such interpolation. For example, in the situation illustrated in FIG. 7A, interpolating processing for the pixel B does not involve pixels removed therefrom by eight or more pixels.

Thus, as described above, pixels near the pixel B may be perfectly interpolated by using the peripheral pixels in the interpolating area. Furthermore, since the interpolating process may be performed in a predetermined manner or rate with regard to the periphery of the interpolating area, flickering of a display image near a threshold value(s) may be reduced so as to provide a relatively smooth display image.

In performing perfect interpolation for the pixels of a moving portion, differences in pixels along vertical and oblique directions around the pixel to be interpolated may be compared and a mean value of the minimum difference values may be obtained. For example, and with reference to FIG. 7B, the values of $|K-P|$, $|L-O|$, $M-N|$ may be compared and when $|L-O|<|M-N|<|K-P|$, the following mean value may be obtained:

$$Z=(L+O)/2$$

Thus, the value of the pixel Z may be defined as equal to the mean value of the pixel L and pixel O.

Therefore, more precise pixel information may be obtained by utilizing the above-described interpolation technique along with the upper, lower, and oblique surrounding pixels of the respective pixel in which motion has been detected.

An operation involving the above-described motion detection and field interpolation wherein an operator may activate the same by use of a graphical user interface will now be described.

Figure 8A:
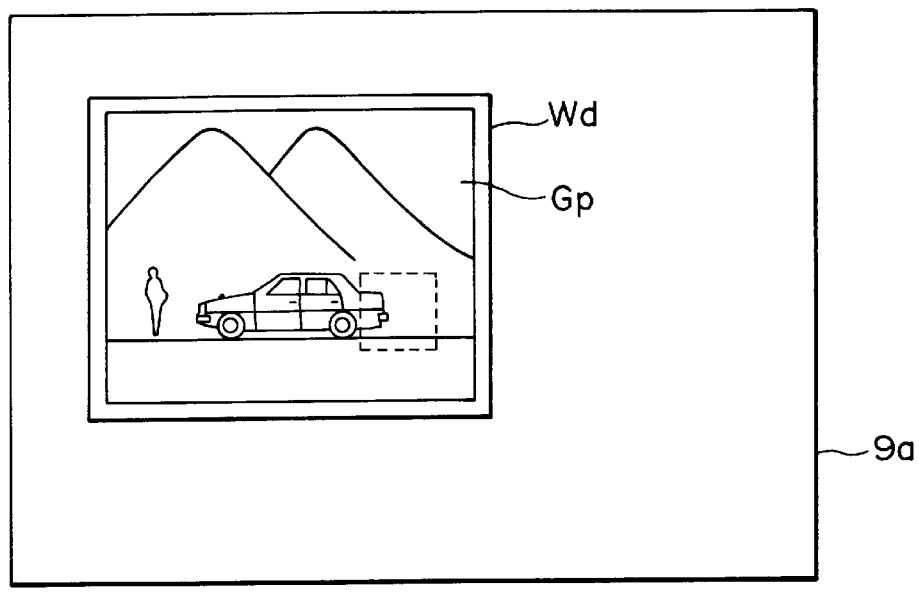
FIGS. 8A and 8B are diagrams to which reference will be made in explaining a motion detecting and field interpolating operation with regard to a display screen of the monitor unit.

Upon selecting a desired image file Gp from captured image files, the desired image file Gp (which may be read from the recording medium 6) may be displayed in a display window Wd of the display 9a of the monitor unit 9 as shown in FIG. 8A. In such display of the image file Gp, stripes (or distortion) may appear due to the deviation between the odd and even lines (such as that shown in FIG. 5A). (As previously described, such deviation may be a result of the moving portion of the desired image.)

While viewing the image file Gp displayed on the display 9a, the operator may select or designate a part of the image which is deteriorated or distorted. Such designation may be performed by moving a pointer (not shown) with the use of the input device 10 to the appropriate position and entering such position (by, for example, clicking the mouse of the input device). As a result, the designated portion may be displayed within a broken line. For example, in FIG. 8A, the rear portion of an automobile has been designated and, as such, is displayed within area or region defined by a broken line.

Figure 8B:
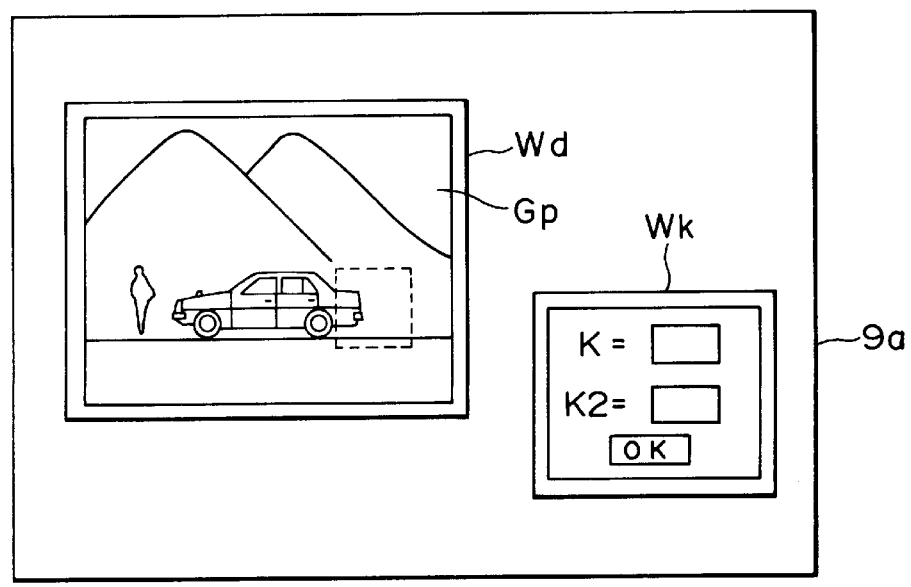

After designating a portion of the image as described above, motion detection may be performed for the designated region. In such motion detection processing, the coefficients K and K2 may be obtained from predetermined values which were previously stored in the control device 4. Alternatively, the operator may set the coefficients K and K2 in accordance with the strips or distorted condition of the image in the designated region. That is, in this latter situation, when a desired region has been designated and a deinterlace processing item has been selected as hereinafter described, a window Wk for setting the K and K2 coefficients may be displayed as shown in FIG. 8B. After the window Wk is displayed, the operator may input values for the coefficients K and K2 and may set such values by clicking or activating an "OK" button or area. In any event, whether the coefficients K and K2 have been set to predetermined values or whether they have been set by an operator, motion may be detected in accordance with the coefficients K and K2. Further, whether or not the coefficients K and K2 may be set by an operator may be determined by a previously entered input or command signal.

After motion detection processing has been performed, and when the deinterlace processing item has been selected, the field interpolation processing may be performed for the designated or interpolating region. Such deinterlace processing item may be selected with the use of a menu item (not shown) which may be a displayed menu bar or the like. Further, selecting or activating the deinterlace processing item may cause deinterlace processing, such as the converting of an interlaced image to an equivalent progressive-scanned image by interpolation processing, to be performed.

If, however, a designated or interpolation region is not designated, motion detection and interpolation processing may be performed for the entire area of the image file Gp.

Figure 9:
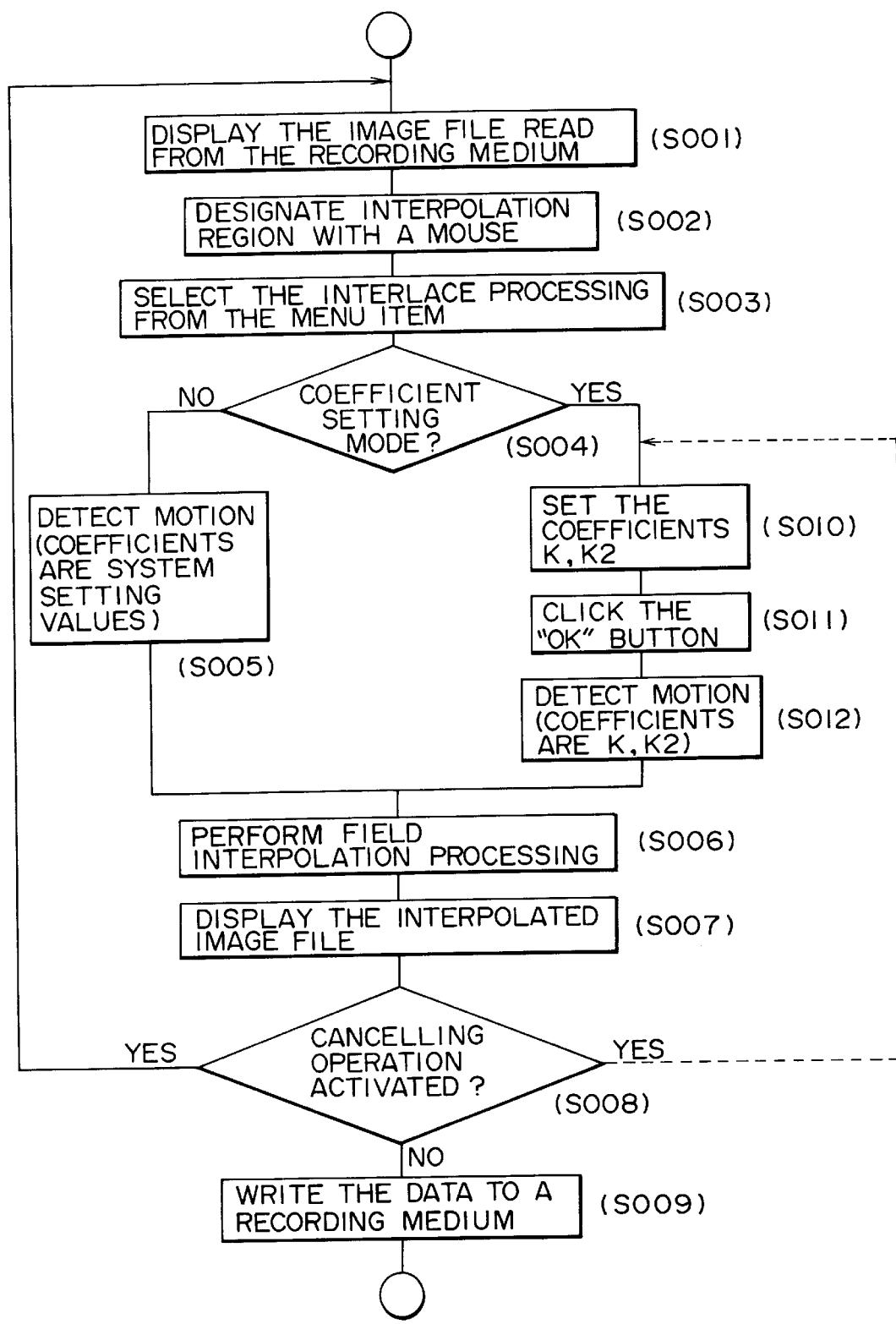
FIG. 9 is a flowchart to which reference will be made in explaining a motion detection and field interpolating operation.

A further description of the motion detection and field interpolation processing described with reference to FIGS. 8A and 8B will now be presented with reference to the flowchart shown in FIG. 9.

Initially, a desired image file may be read from the recording medium 6 and displayed in the display window Wd of the display 9a, as indicated in step S001. Processing then proceeds to step S002 wherein a region is designated by using a mouse or the like of the input device 10. Such region may be used for performing motion detection and/or field interpolation processing of the desired image file. Thereafter, processing proceeds to step S003 wherein an interlace processing item may be selected from a menu item.

Processing then proceeds to step S004 wherein a determination is made as to whether the coefficient setting mode has been set. In other words, whether the coefficient(s) utilized for motion detection are to be set by the operator. If such determination is negative, processing proceeds to step S005 wherein the values preset or stored previously in the control device 4 are utilized as the coefficients K and K2 for the motion detection processing. Thereafter, processing proceeds to step S006.

In step S006, field interpolation processing may be performed for the pixels associated with the moving portion in accordance with the results of the motion detection. Thereafter, processing proceeds to step S007 wherein the interpolated image file may be displayed on the display 9a.

After displaying the interpolating image file in step S007, processing proceeds to step S008 wherein a determination is made as to whether the interpolation processing should be canceled. That is, in step S008, the operator determines whether the image file displayed on the display 9a is acceptable. If the operator determines that such displayed image file is acceptable, the interpolation processing is not canceled and processing proceeds to step S009 wherein the field interpolated image file may be written into the recording medium 6. On the other hand, if the operator determines that the displayed image file is not acceptable, the interpolation processing is canceled and processing returns to step S001 (through the route indicated by a solid line) whereupon the original image prior to processing (which is read from the recording medium 6) may be displayed. In this latter situation, the process (that is, designating another interpolation region and performing motion detection and field interpolation) may be repeated until an acceptable display is obtained.

Returning to step S004, if the determination in step S004 is affirmative (so that the coefficient setting mode has been set), processing proceeds to steps S010–S012. In these steps, the coefficient setting window Wk (FIG. 8B) may be displayed and the operator may input and set values for the coefficients K and K2 in accordance with the condition of the image file displayed on the display 9a. After clicking or activating an "OK" button, motion detection may be performed in accordance with the coefficients K and K2.

After step S012, processing proceeds to step S006. In a manner similar to that previously described, in step S006, interpolation processing may be performed for the pixels having detected motion. Thereafter, in step S007, the field interpolated image file may be displayed on the display 9a. Processing then proceeds to step S008 wherein a determination is made as to whether the interpolation processing should be canceled (that is, the operator determines whether the image file displayed on the display 9a is acceptable). If the operator determines that such displayed image file is acceptable, the interpolation processing is not canceled and processing proceeds to step S009 wherein the field interpolated image file may be written into the recording medium 6. On the other hand, if the operator determines that the displayed image file is not acceptable, the interpolation processing is canceled and processing returns to step S010 (through the route indicated by a broken line) whereupon the coefficients K and K2 may be again set and field interpolation processing performed for the same region. Additionally, if it is desired to designate another region and perform motion detection and/or field interpolation processing therein, such procedure may be obtained by returning to step S001 and then designating the appropriate region. When an acceptable image is obtained, such image may be written into the recording medium 6 and stored therein, as indicated in step S009.

Therefore, if a "coefficient setting mode" has been set, the coefficients K and K2 may be freely set by an operator while viewing the displayed image on the display 9a. Thereafter, field interpolation processing may be performed depending on the condition of image file and the resulting interpolated image may be reviewed by the operator. If acceptable, such interpolated image may be stored in the recording medium, and, if not acceptable, the process may be repeated. On the other hand, if the "coefficient setting mode" has not been set, (such as in situation wherein it may be troublesome for the operator to set the coefficients K and K2), simplified motion detection may be performed using the value(s) preset in the control device for the coefficients K and K2. Thereafter, field interpolation processing may be performed in a similar manner.

Thus, in the present invention, image data in predetermined units (such as frame units or the like) which has been extracted from digital moving image data supplied from an external device may be subjected to motion detection and field interpolation processing. As a result of such processing, an image corresponding to the extracted or stationary image data which may have "moving" portions therein may be displayed in an acceptable manner. In other words, stripes or the like which may otherwise be displayed in a stationary image display due to a deviation of field data may be suppressed by the motion detection and field interpolation processing so as to provide a displayed stationary image having a relatively high quality which may be similar to that of the original image.

Further, the present invention may enable the coefficients for motion detection to be set by an operator while stationary image data is displayed on the monitor unit. As a result, an interpolation process suitable for such stationary image data may be performed.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. An apparatus for processing moving image data so as to obtain stationary image data representative of a desired image picture and suitable for display on a display device, said apparatus comprising:

means for designating a first region in an image picture;

motion detecting means for detecting motion in the designated first region in accordance with at least one motion detection coefficient, in which each said motion detection coefficient is setable by an operator to a desired value;

interpolating means for interpolating the image data in accordance with the motion detection results by use of a predetermined interpolation technique;

means for causing the interpolated image data to be outputted for display on the display device for observation by the operator; and means, operative when the operator determines that the display is unacceptable, for performing one of (i) designating a second region in the image picture, detecting motion in the second designated region in accordance with the at least one motion detection coefficient, interpolating the image data in accordance with the motion detecting results of the second designated region and causing the latest interpolated image data to be outputted for display on the display device for observation by the operator and (ii) resetting at least one said motion detection coefficient, detecting motion in the first designated region in accordance with the at least one reset motion detection coefficient, interpolating the image data in accordance with the latest motion detecting results of the first designated region and causing the latest interpolated image data to be outputted for display on the display device for observation by the operator.

2. An apparatus for processing moving image data according to claim 1, further comprising means for generating a data file from the moving image data.

3. A method for processing moving image data so as to obtain stationary image data representative of a desired image picture and suitable for display on a display device, said method comprising the steps of:

designating a first region in an image picture;

detecting motion in the designated first region in accordance with at least one motion detection coefficient, in which each said motion detection coefficient is setable by an operator to a desired value;

interpolating the image data in accordance with the motion detection results by use of a predetermined interpolation technique;

causing the interpolated image data to be outputted for display on the display device for observation by the operator; and performing one of (i) designating a second region in the image picture, detecting motion in the second designated region in accordance with the at least one motion detection coefficient, interpolating the image data in accordance with the motion detecting results of the second designated region and causing the latest interpolated image data to be outputted for display on the display device for observation by the operator and (ii) resetting at least one said motion detection coefficient, detecting motion in the first designated region in accordance with the at least one reset motion detection coefficient, interpolating the image data in accordance with the latest motion detecting results of the first designated region and causing the latest interpolated image data to be outputted for display on the display device for observation by the operator, when the operator determines that the display is unacceptable.

4. A method for processing moving image data according to claim 3, further comprising the steps of:

displaying an operation format;

generating display format information for display on said display device;

capturing image data and writing the same to a recording medium as a stationary data file; and retrieving a desired stationary data file for use as the image picture.

5. An apparatus for processing image data so as to obtain stationary image data representative of a desired image and for displaying an image corresponding thereto, said apparatus comprising:

means for receiving image data corresponding to a plurality of frames and representative of a moving picture, in which each of said frames includes a first field and a second field;

means for selecting a desired frame;

means for designating a first region in the selected frame;

motion detecting means for detecting motion in the designated first region in accordance with at least one motion detection coefficient, in which each said motion detection coefficient is setable by an operator to a desired value;

interpolating means for interpolating the image data in accordance with the motion detection results by utilizing image data of the first and second fields of the respective frame so as to obtain said stationary image data;

display means for displaying an image corresponding to said stationary image data for observation by an operator; and means, operative when the operator determines that the displayed image is unacceptable, for performing one of (i) designating a second region in the selected frame, detecting motion in the second designated region in accordance with the at least one motion detection coefficient, interpolating the image data in accordance with the motion detecting results of the second designated region so as to obtain second stationary image data and displaying the same on the display means for observation by the operator and (ii) resetting at least one said motion detection coefficient, detecting motion in the first designated region in accordance with the at least one reset motion detection coefficient, interpolating the image data in accordance with the latest motion detecting results of the first designated region so as to obtain third stationary image data and causing the same to be displayed on the display means for observation by the operator.

6. A method for processing image data so as to obtain stationary image data representative of a desired image and for displaying an image corresponding thereto, said method comprising the steps of:

receiving image data corresponding to a plurality of frames and representative of a moving picture, in which each of said frames includes a first field and a second field;

selecting a desired frame;

designating a first region in the selected frame;

detecting motion in the designated first region in accordance with at least one motion detection coefficient, in which each said motion detection coefficient is setable by an operator to a desired value;

interpolating the image data in accordance with the motion detection results by utilizing image data of the first and second fields of the respective frame so as to obtain said stationary image data;

displaying an image corresponding to said stationary image data for observation by an operator; and performing one of (i) designating a second region in the selected frame, detecting motion in the second designated region in accordance with the at least one motion detection coefficient, interpolating the image data in accordance with the motion detecting results of the second designated region so as to obtain second stationary image data and displaying the same for observation by the operator and (ii) resetting at least one said motion detection coefficient, detecting motion in the first designated region in accordance with the at least one reset motion detection coefficient, interpolating the image data in accordance with the latest motion detecting results of the first designated region so as to obtain third stationary image data and causing the same to be displayed for observation by the operator, when the operator determines that the displayed image is unacceptable.

7. An apparatus for processing moving image data so as to obtain stationary image data representative of a desired image picture and suitable for display on a display device, said apparatus comprising:

an image capturing board for receiving said moving image data from an external source; and a central processing unit for selecting the image data corresponding to a desired picture, for detecting motion in a first designated region thereof in accordance with at least one motion detection coefficient in which each said motion detection coefficient is setable by an operator to a desired value, for interpolating the image data in accordance with the motion detection results by use of a predetermined interpolation technique, for causing the interpolated image data to be outputted for display on the display device for observation by the operator, and, when the operator determines that the display is unacceptable, for performing one of (i) designating a second region in the image picture, detecting motion in the second designated region in accordance with the at least one motion detection coefficient, interpolating the image data in accordance with the motion detecting results of the second designated region and causing the latest interpolated image data to be outputted for display on the display device for observation by the operator and (ii) resetting at least one said motion detection coefficient, detecting motion in the first designated region in accordance with the at least one reset motion detection coefficient, interpolating the image data in accordance with the latest motion detecting results of the first designated region and causing the latest interpolated image data to be outputted for display on the display device for observation by the operator.

8. An apparatus for processing moving image data according to claim 7, further comprising means for generating a data file from the moving image data.

9. An apparatus for processing image data so as to obtain stationary image data representative of a desired image and for displaying an image corresponding thereto, said apparatus comprising:

an image capture board for receiving image data corresponding to a plurality of frames and representative of a moving picture, in which each of said frames includes a first field and a second field;

a graphical user interface for selecting a desired frame and for designating a first region in the selected frame;

a video display for displaying an image for observation by an operator; and a central processing unit for detecting motion in the designated first region in accordance with at least one motion detection coefficient in which each said motion detection coefficient is setable by the operator to a desired value, for interpolating the image data in accordance with the motion detection results by utilizing image data of the first and second fields of the respective frame so as to obtain said stationary image data, and for performing one of (i) designating a second region in the selected frame, detecting motion in the second designated region in accordance with the at least one motion detection coefficient, interpolating the image data in accordance with the motion detecting results of the second designated region so as to obtain second stationary image data and displaying the same on the display for observation by the operator and (ii) resetting at least one said motion detection coefficient, detecting motion in the first designated region in accordance with the at least one reset motion detection coefficient, interpolating the image data in accordance with the latest motion detecting results of the first designated region so as to obtain third stationary image data and causing the same to be displayed on the display for observation by the operator, when the operator determines that the displayed image is unacceptable.

* * * * *